Patented Dec. 16, 1930

1,784,811

UNITED STATES PATENT OFFICE

VERE B. BROWNE, OF BRACKENRIDGE, PENNSYLVANIA

SILICON STEEL

No Drawing.    Application filed February 13, 1930. Serial No. 428,244.

High grade silicon steel as produced today containing from about 3.50% to about 4.50% silicon is characterized by certain magnetic properties and particularly by having a low watt loss value; this value being to some extent correlated with the silicon content.

In a general sense, it can be said (all conditions being equal) that the magnetic property is in inverse ratio to the silicon content; the lower the silicon the higher the watt loss value which will be obtained, and the higher the silicon the lower the watt loss value.

Unfortunately under the present methods of production, when the silicon is increased above 4.50%, the resulting product is generally brittle and on this account loses its commercial value so that the highest grade of this material is generally confined to from 4.00% to 4.50% silicon. This product in 29 gauge sheets, as produced by the generally utilized methods of manufacture at present, will yield an alloy having a magnetic value, exclusive of cutting strains, and as tested by the standard Epstein method, of from .520 to .700 watts per lb. at 60 cycles and 10,000 lines, and a mill annealed value, including cutting strains of not less than .600 watts per pound. Although occasional results lower than this may have been obtained, to my knowledge it is extremely rare to obtain a magnetic value below .520 watts per pound and practically impossible to get any material below .500 watts per pound.

I have discovered that silicon steel can be consistently made within the range of 4 to 4½% and up to 5% silicon and having a magnetic value of less than .500 watts per pound, exclusive of cutting strains, and a mill annealed value, including cutting strains, of less than .600 watts per pound. I have also found that these alloys of silicon steel are more ductile than the alloys made by the standard processes and on this account it is possible to increase the range of the silicon content somewhat above the present established range. Besides the low watt loss value, this product is also characterized by high permeability, especially at low densities, and is therefore of particular value in apparatus such as radio transformers and the like.

In order to obtain this product, I melt down scrap in an electric arc or induction furnace, completely remove the silicon, and reduce the carbon as low as practicable. I then remove the oxidizing slag and refine the metal under a special calcium aluminate slag in the presence of a reducing agent, this slag in general being described in my Patent 1,658,879. In preparing this slag, I apply to the surface of the clean metal from which the oxidizing slag has been removed, a mixture of pure burnt lime (CaO) and alumina ($Al_2O_3$) in proportions of about 70 parts CaO to about 30 parts $Al_2O_3$). This particular combination is not essential, but I have found that it has a satisfactory melting point and becomes fluid in a relatively short space of time. As soon as fluidity of this slag is obtained, it will be found that the slag has absorbed the oxides present in the metal, apparently owing to the solution pressure of the two liquids or in other words the dissolved oxides in the metal migrate to the slag. I then add preferably in repeated small portions an intimate mixture of aluminum powder and basic material which may be either lime or alumina or a mixture of these,—the mixture containing the aluminum powder being as intimate as possible in order to protect the aluminum from premature oxidation. Aluminum reduces the oxides present in the slag and further oxides are absorbed from the metal. As the aluminum is added in this manner the protective coating becomes progressively more and more fusible until there is formed a highly fluid slag which exhibits a remarkable affinity for the oxide contents and also the sulphur contents of the metal.

While the nature of the chemical and physical action cannot as yet be clearly defined, it is noticeable that following each addition of the aluminum-lime mixture, up to a certain point, the slag darkens rapidly, owing to absorption of oxides from the bath, such darkening becoming less and less and finally disappearing when deoxidation is complete. It is apparent that this slag has a much greater affinity for the oxides than has the metal bath, with the result that the oxides, as well as the sulphur compounds, migrate rapidly into the slag. Further additions of aluminum are made until the removal of oxides from the metal is complete, a condition which manifests itself in a very characteristic manner, which permits the process to be controlled with a degree of exactitude impossible with any other slag with which I am familiar.

The first manifestation occurs when a metal rod which has been dipped into the slag is plunged into water. A strong evolution of gas occurs, amounting at times almost to an explosion, and causes the slag to fluff up into a feathery mass resembling snowflakes. This manifestation appears only toward the completion of the deoxidation; and I have found by experience that when this condition has persisted for a period of about ten minutes, it is quite safe to tap the metal, which will be found substantially free from oxides, low in sulphur, and of a composition to roll satisfactorily. For convenience and brevity, I will hereinafter refer to this phenomenon simply as the "test condition".

I have observed that when the slag has reached the test condition above mentioned, the mass of slag in the furnace appears to be frothing, giving out large volumes of gas which burn with a bluish flame. This gas must of necessity be derived from the metal.

When the slag is dropped into water the evolved gases smell strongly of hydrogen sulphide, indicating the desulphurizing nature of the operation. This is confirmed by the analytical results. In one specific case the sulphur was reduced from .044 to .028% in the space of twenty minutes; and high grade alloys prepared by this process will run consistently with a sulphur content of .01 to .018%, a result not attainable from the same materials by the reduction methods as ordinarily practiced.

A feature of the process is to keep the content of silica in the slag as low as practicable, because the aluminum will reduce the silica to silicon, which passes to the metal bath and causes the absorption of gases by the metal. This fact is believed to account in large measure for the many failures which have attended the use of aluminum in the past, because it has been the custom in all such cases to add either sand or fluorspar to the secondary lime slag before the reduction, to improve its fusibility. In case sand is added, silicon will be reduced directly into the metal. In case fluorspar is used, as is the normal practice in most steel melting shops, the fluorin which is evolved attacks the brick lining of the furnace with formation of silicon tetrafluoride, which is taken up by the slag and breaks up in turn with liberation of more fluorin, thus repeating the cycle indefinitely; so that even relatively small additions of fluorspar may eventually result in slags which are quite high in silica.

I have found that at the end of this process the molten practically pure iron that has been subjected to the chemical and physical action of this slag can be cast into test blocks and it will solidify in a quiet manner without any evolution of gas as is characterized by metals of the same composition made by other processes. In other words, the metal, in the vernacular of those skilled in the art, is dead or killed without any addition of reducing metals, and actual analysis will show only a trace of either silicon or aluminum in this product.

To this highly purified metal I add ferro silicon in the desired quantity and maintain the calcium aluminate slag in the desired condition as above described to make sure that no further absorption of oxides takes place from the melting down of the ferro silicon into the product, tap the metal into the ladle and cast into ingots in the regular way. The product when rolled into 29 gauge sheets by standard methods will have remarkable properties and will test under the standard Epstein method of testing under .500 watts per pound exclusive of cutting strains.

By way of example I give the watt loss results of a number of heats of which are representative of this product.

| Heat No. | Silicon per cent | Loss in watts per pound at 10000-B 60 cycles, 0.014" (29 gauge) sheets cutting strains not included. | |
|---|---|---|---|
| | | | Average |
| 15808 | 4.35 | .477 | .477 |
| 15809 | 4.30 | .468 | .474 |
| | | .476 | |
| 15813 | 4.84 | .484 | |
| | | .490 | .488 |
| 14695 | 4.37 | .468 | .468 |
| 14697 | 4.21 | .472 | .472 |
| 15827 | 4.55 | .476 | |
| | | .467 | .472 |
| 15828 | 4.13 | .505 | |
| | | .476 | |
| | | .500 | |
| | | .490 | .495 |
| 15829 | 4.13 | .494 | |
| | | .504 | .498 |
| 15830 | 4.49 | .458 | |
| | | .488 | |
| | | .479 | .477 |
| 15831 | 4.04 | .506 | .506 |
| 15832 | 4.43 | .464 | .464 |
| 15833 | 4.44 | .472 | .472 |
| 15838 | 4.53 | .498 | .498 |

In order to illustrate the permeability values of this product at low densities, I have used a well known method of testing.

The apparatus used is a modified inductance bridge. Each of two arms of this bridge consists of a 25 ohm non-inductive resistance, the third arm is a standard inductance of 65 millihenries and the fourth arm the primary winding of a standard Epstein frame described in Paragraph 9b of the A. S. T. M. Standards A–34–28. A source of 60 cycles 110 volt A. C. current having a wave form such that the ratio of the crest value to the root mean square value shall be the square root of two with an allowable maximum variation of plus or minus 10%, is connected through a 250:1 ratio transformer to opposite points of the bridge, one secondary connection being made at the junction of the 25 ohm resistance and the standard inductance and the other connection between the junction of the other 25 ohm resistance and the primary winding of the Epstein frame.

The fixed coil of a detector is connected across the primary of the above transformer and the moving coil connected between the junction of the resistance arms and the inductance arms.

The sample used is a standard Epstein sample prepared in accordance with the A. S. T. M. Standards A-34-28. The sample is inserted in the frame, using .004" paper spacers at the joints.

With 92.5 volts across the primary of the transformer a maximum induction of 17.5 gausses is maintained in the test sample.

Under these conditions a balance bridge gives a permeability of 437 which is the zero setting on the detector. The scale of the detector is arbitrarily calibrated for plus and minus deflections. Minus deflection corresponding to lower permeability values and plus deflection corresponding to higher permeability values, the detector being so connected that when one leg of the sample is removed from the frame, the deflection is to the minus side of the scale.

*Calibration data (cutting strains included)*

| Deflection | Permeability |
|---|---|
| −5 | 354 |
| 0 | 430 |
| +5 | 562 |
| +10 | 720 |

Tested in accordance with the above method, silicon steel made in the regular manner shows the following after mill annealing.

| Heat No. | Silicon | Values |
|---|---|---|
| 6634 (Open hearth) | 4.22 | +2.1 +3.0 +3.5 +3.7 |
| 6632 (Open hearth) | 4.30 | +2.9 +2.8 |
| 4492 (Open hearth) | 4.28 | +3.0 +2.2 |
| 17020 (Arc furnace) | 4.43 | −.5 −1.5 | or permeabilities ranging from 400 to 550, including cutting strains when tested in the above manner.

Silicon steel made in accordance with new method give following values after mill annealing.

| Heat | Silicon | Values |
|---|---|---|
| 15798 | 3.85 | +7.9 |
| 15808 | 4.35 | +6.1 |
| 15809 | 4.30 | +7.0 |
| 15810 | 4.31 | +7.0 |
| 15811 | 4.31 | +7.0 | or permeabilities ranging from 595 to 655 including cutting strains when tested in the above manner.

In preparing the above slag I do not confine myself to the use of burnt lime and alumina. I may use burnt lime alone and add to this covering of burnt lime a mixture of lime and aluminum which will accomplish the same results. This, however, is somewhat less economical for the reason that a large proportion of the aluminum is oxidized to form alumina owing to the refractory nature of the straight burnt lime slag.

I do not confine myself in making this product, to melting down of scrap in the arc furnace. It will be obvious to those skilled in the art that the same product can be produced by transferring hot metal either from the Bessemer converter or open hearth furnace, in accordance with either Patent No. 1,570,229 of January 19, 1926 or No. 1,574,550 of February 23, 1926, to the arc furnace and completing the operation as described above. I may also melt down an entire charge of silicon scrap in the furnace, remove the initial slag which is formed by the melting down and which will contain a rather high percentage of silica, replace this slag with the calcium aluminate slag as described above, and refine the metal under this slag. Considerable saving is accomplished by this procedure.

What I claim as new and desire to secure by Letters Patent is:

1. Silicon steel containing at least about 3.% silicon and characterized by having a watt loss value exclusive of cutting strains of less than .500 watts per pound as indicated by the standard Epstein test and by having relatively high permeability.

2. Silicon steel containing at least about 3.50% of silicon and characterized by having a watt loss value exclusive of cutting strains of less than .500 watts per pound as indicated by the standard Epstein test and by having relatively high magnetic permeability especially at relatively low flux densities.

3. Silicon steel having a silicon content of from about 3.50% to about 5% and characterized by having a watt loss value exclusive of cutting strains of less than .500 watts per pound as indicated by the standard Epstein test and by having a magnetic permeability 10–30% higher at a flux density of 17.5–B.

4. Silicon steel having a silicon content of from 3.50% to about 4.50% and characterized by having a mill annealed value including cutting strains of less than .600 watts per pound as tested by standard Epstein method and by having relatively high permeability.

5. Silicon steel having a silicon content of over 3.50% and characterized by having a mill annealed value including cutting strains of less than .600 watts per pound as tested by standard Epstein method and by having relatively high magnetic permeability especially at relatively low flux densities.

6. Silicon steel having a silicon content of from about 3.50% to about 5%, being substantially free from gases and characterized by having a mill annealed value including cutting strains of less than .600 watts per pound as indicated by standard Epstein test and by having a magnetic permeability 10–30% higher at a flux density of 17.5–B.

7. Silicon steel containing silicon above 3.50% and having a watt loss value exclusive of cutting strains of less than .500 watts per pound as indicated by the Epstein test and characterized by high permeability, said steel being of increased ductility and substantially free from occluded gases.

8. Silicon steel having a silicon content of from about 3.50% to about 5%, being substantially free from gases and solid inclusions and characterized by having a mill annealed value including cutting strains of less than .600 watts per pound as indicated by standard Epstein test and by having a magnetic permeability 10–30% higher at a flux density of 17.5–B.

9. Silicon steel containing silicon above 3.50% and having a watt loss value exclusive of cutting strains of less than .500 watts per pound as indicated by the Epstein test and characterized by high permeability.

In testimony whereof, I have hereunto subscribed my name this 8th day of February, 1930.

VERE B. BROWNE.

ized by having a mill annealed value including cutting strains of less than .600 watts per pound as tested by standard Epstein method and by having relatively high permeability.

5. Silicon steel having a silicon content of over 3.50% and characterized by having a mill annealed value including cutting strains of less than .600 watts per pound as tested by standard Epstein method and by having relatively high magnetic permeability especially at relatively low flux densities.

6. Silicon steel having a silicon content of from about 3.50% to about 5%, being substantially free from gases and characterized by having a mill annealed value including cutting strains of less than .600 watts per pound as indicated by standard Epstein test and by having a magnetic permeability 10–30% higher at a flux density of 17.5–B.

7. Silicon steel containing silicon above 3.50% and having a watt loss value exclusive of cutting strains of less than .500 watts per pound as indicated by the Epstein test and characterized by high permeability, said steel being of increased ductility and substantially free from occluded gases.

8. Silicon steel having a silicon content of from about 3.50% to about 5%, being substantially free from gases and solid inclusions and characterized by having a mill annealed value including cutting strains of less than .600 watts per pound as indicated by standard Epstein test and by having a magnetic permeability 10–30% higher at a flux density of 17.5–B.

9. Silicon steel containing silicon above 3.50% and having a watt loss value exclusive of cutting strains of less than .500 watts per pound as indicated by the Epstein test and characterized by high permeability.

In testimony whereof, I have hereunto subscribed my name this 8th day of February, 1930.

VERE B. BROWNE.

DISCLAIMER 1,784,811.—*Vere B. Browne*, Brackenridge, Pa. SILICON STEEL. Patent dated December 16, 1930. Disclaimer filed October 22, 1932, by the patentee.

Hereby disclaims from the scope of claims 5, 7, and 9 of said patent any silicon steel except that defined by said claims and in which the silicon content is not over 5 per centum.

[*Official Gazette November 22, 1932.*]

DISCLAIMER 1,784,811.—*Vere B. Browne*, Brackenridge, Pa. SILICON STEEL. Patent dated December 16, 1930. Disclaimer filed October 22, 1932, by the patentee.

Hereby disclaims from the scope of claims 5, 7, and 9 of said patent any silicon steel except that defined by said claims and in which the silicon content is not over 5 per centum.

[*Official Gazette November 22, 1932.*]